Patented Sept. 13, 1932

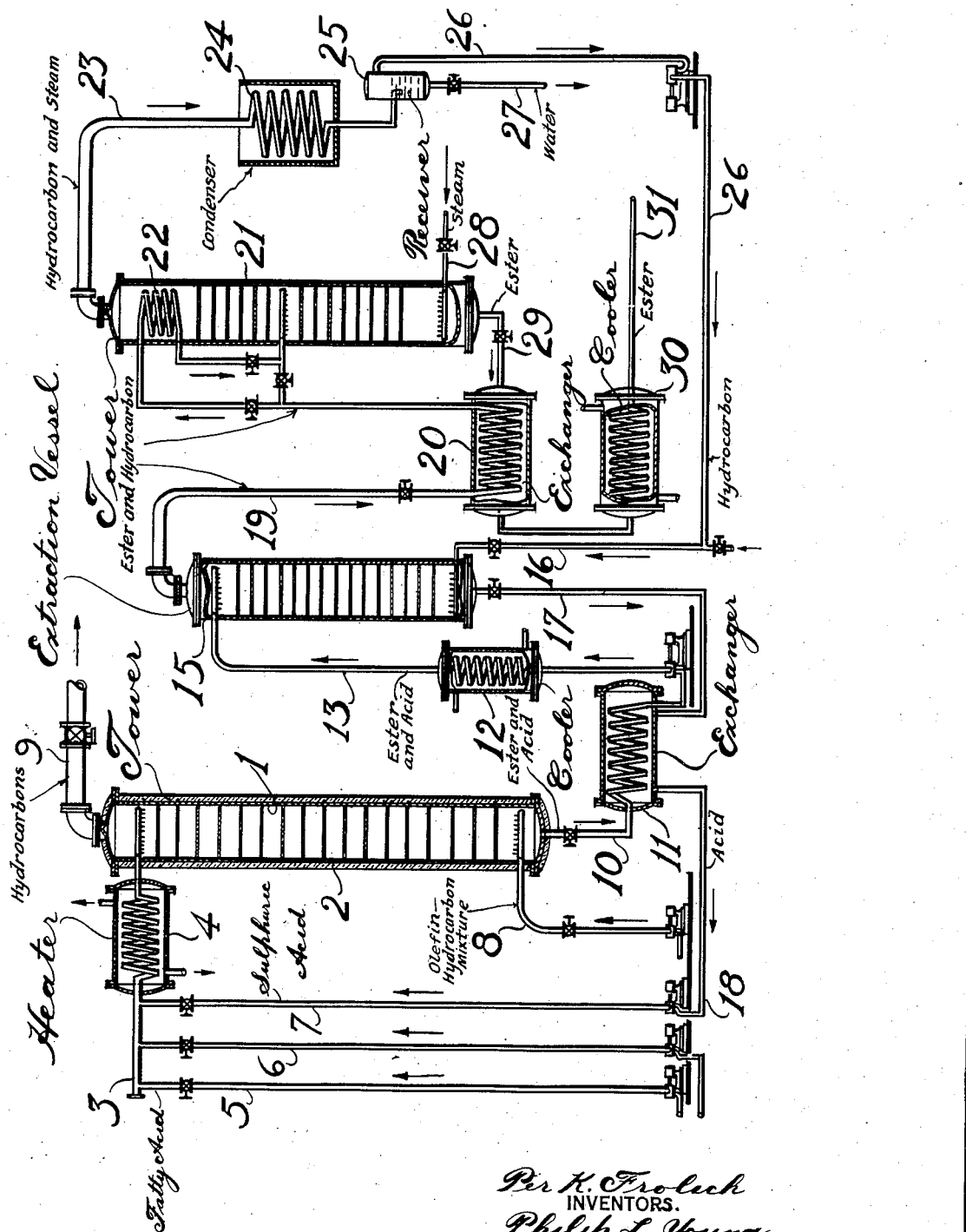

1,877,291

UNITED STATES PATENT OFFICE

PER K. FROLICH, OF ELIZABETH, NEW JERSEY, AND PHILIP L. YOUNG, OF NEW YORK, N. Y., ASSIGNORS TO STANDARD OIL DEVELOPMENT COMPANY

CONTINUOUS METHOD OF PRODUCING ESTERS FROM OLEFINS

Application filed January 21, 1930. Serial No. 422,288.

The present invention relates to an improved process for obtaining valuable products from unsaturated gases and liquids and more specifically comprises an improved method for directly esterifying such olefins with fatty acids and the like. The present invention will be fully understood from the following description and the drawing which indicates suitable apparatus for carrying out the process.

The drawing is a diagrammatic view in sectional elevation of an apparatus constructed according to my invention and indicates the flow of the various materials in the process.

A previous patent U. S. No. 1,365,052, filed June 30, 1916 in the names of Carlton Ellis and Mortimer J. Cohen and granted January 11, 1921, describes the method of recovering olefins from gaseous and liquid mixtures and directly esterifying the same by use of a fatty or similar organic acid, together with sulphuric acid which acts as a catalytic agent. The present method comprises an improvement for the above process by which larger yields can be obtained together with the advantages of a continuously operating process.

Referring to the drawing—reference numeral 1 indicates a tower or other similar devices for bringing about an intimate contact between gases and liquids or between immiscible liquids of different densities. The tower may be packed with suitable contacting devices, such as bell-cap plates, Raschig rings and the like, and may be provided with a stirring means to operate on each plate if desired. The tower is also protected from loss of heat by a suitable layer indicated by the numeral 2 and if desired heating and cooling coils may be imbedded in the insulation in order to maintain the tower 1 at a proper reaction temperature.

Manifold 3 is fed with substantially anhydrous fatty acid through pipe 5 and sulphuric acid through pipe 7. Pipe 6 may be used for the introduction of additional sulphuric acid or hydrocarbon oil, such as gas oil and particularly with gas oil containing 2 to 5% of sulphonated castor oil or similar agent. The mixture from the three pipes flows through manifold 3 through heater 4 and into the top of tower 1 and in flowing therethrough is brought into intimate counter-current contact with a stream of hydrocarbon gas or vapor which is introduced at the base of the tower through pipe 8. In passing counter to the current of hydrocarbon fluid the absorption mixtures react with the olefin content of the hydrocarbon and substantially completely dissolve all unsaturated hydrocarbons from the mixture introduced through pipe 8. The saturated hydrocarbons together with whatever unsaturated hydrocarbons may escape absorption, find exit from the tower at the top by means of pipe 9 and the absorption product flows from the base of the tower by pipe 10 through heat exchanger 11, cooler 12 and is discharged by means of pipe 13 into the top of an extraction vessel 15. The extraction vessel may be constructed in any suitable form but a tower is most desirable and it may be constructed similarly to tower 1, except that it need not be so large. Low boiling liquid hydrocarbons, either in a pure state, or as mixtures are fed into the base of absorption vessel 15 by pipe 16 and in flowing upward against the current of material from tower 1 dissolve fatty acid esters from the liquid and the solvent rich in the extracted product flows out by line 19. Sulphuric acid from which the esters have been almost completely removed flows from the base of the tower by line 17 through exchanger 11 and by line 18 back to pipe 7 for re-circulation through tower 1.

The liquid flowing in pipe 19 is preheated in an exchanger 20 and is then forced into the tower 21 although it may be previously preheated by flowing through a coil 22 which is provided in the upper portion of tower 21 to furnish reflux for such tower. Vapors from the tower flow by vapor line 23 to condenser 24 and receiver 25 from which the solvent is removed by line 26 and conducted back to the base of tower 15 at which it is fed by line 16 as noted above. Condensed steam is removed from receiver 25 by line 27. The tower may be heated in any suitable manner, for example; by a closed coil or otherwise, but it is preferable to heat by the introduction of superheated steam through pipe 28. The ester freed of low boiling solvent then flows by line 29 through exchanger 20 and cooler 30 and line 31 to storage.

In the operation of my process a mixture of a substantially anhydrous fatty acid, such as glacial acetic acid, with sulphuric acid flows into the top of an absorption tower constructed so as to provide substantially complete counter current flow with an unsaturated hydrocarbon or mixture of saturated and unsaturated hydrocarbons which are simultaneously introduced into the base of the tower. The unsaturated hydrocarbons may comprise a cracked oil or gas or a condensate or portion therefrom, such as a mixture of propane and propylene or butane and butylene, or other unsaturated hydrocarbons containing more than two carbon atoms. The temperature of the absorption may be from about 50 to 150° C. but it is preferable to maintain a nearly uniform temperature of about 75° C. The ratio of acetic acid to sulphuric acid may vary somewhat but it is preferable to provide about 2.4 parts of weight of the anhydrous fatty acid for one part of weight of sulphuric acid on the basis of 100% $H_2SO_4$, although the actual concentration of the sulphuric acid may be lower, for example; 95.5% or 80% by weight may be used. The sulphuric acid should be above 53° Bé. in all cases, and it is desirable to use a relatively weaker acid for the higher olefins such as amylene and hexylene and stronger for the lower olefins such as propylene. The pressure in the tower is preferably somewhat lower than the vapor pressure of the particular hydrocarbon mixture used. For example; with a mixture of butane and butylene a pressure of 100 to 180 pounds per square inch (say 150 pounds per square inch) is satisfactory. With higher hydrocarbons the pressure may be proportionately lower and with lower hydrocarbons it is ordinarily preferable to increase the pressure. Gas oil or kerosene is added at the top of the tower along with the sulphuric acid and fatty acid and it is then not necessary to resort to such high pressures, but it is preferable to omit the oil and maintain as high a concentration of olefins as possible. The flow in the tower is regulated so that the time of contact is between two and four hours for the best results and under such conditions yields of almost 100% ester based on the fatty acid can be obtained. The unabsorbed hydrocarbon, preferably in the vapor form, is allowed to flow from the top of the tower and may be condensed and a part thereof may be used for dissolving the ester as indicated above in tower 15. The liquid from the lower end of the column may be treated in any one of a number of methods for the recovery of the ester. For example; the liquid may be diluted with water so as to produce a sulphuric acid concentration of 30% or lower in the liquid layer. The ester then forms a layer floating on top of the acid and may be removed and separated from any oil present, by fractional distillation. Acid may then be re-concentrated and returned to the absorption chamber. On the other hand the preferable method consists in dissolving the ester from sulphuric acid by means of a suitable low boiling liquid solvent such as gasoline or pure hydrocarbon liquid such as pentane or hexane. The sulphuric acid loses none of its activity by this method and can be returned to the absorption vessel without reconcentration while the mixture of hydrocarbon and ester may be separated by fractional distillation, in a tower still as shown in the drawing. If butylene or lower hydrocarbons are being treated it is preferable to hold the pressure on towers 1 and 15 and to release the pressure before distillation of the low boiling solvent from the ester, but the whole operation may be conducted under full pressure if desired. On the other hand tower 1 alone may be held under the high pressure and the solution of the ester, in the low boiling hydrocarbon, which is done in the cold, may be carried on at ordinary pressure.

As an example; on the operation of the present process liquid butylene and glacial acetic acid were contacted in the presence of sulphuric acid for a period of about 3½ hours at a temperature of 75° C. and at 150 pounds per square inch, the volume of acetic acid is four times the volume of the sulphuric acid and the volume of butylene is about 1.67 times the volume of acetic acid. About 52% of the acid is converted into butyl acetate and only about 3% of the butylene is polymerized to tar.

The present process is not to be limited by any theory of the mechanism of the reaction, nor by any example given merely for illustrative purposes, but only by the following claims in which it is desired to claim all novelty inherent in the invention.

We claim:

1. An improved process for obtaining esters from olefins comprising continuously bringing an olefin in vapor form and a substantially anhydrous fatty acid, with each in counter current flow to the other, into a reaction zone in the presence of a catalyst and at a temperature above 50° C. but insufficient to cause the distillation of the esters formed, and continuously withdrawing liquid esterified olefin.

2. An improved process for obtaining esters from olefins comprising continuously passing a hydrocarbon vapor rich in olefins in counter current contact with an anhydrous liquid aliphatic monocarboxylic acid in presence of sulphuric acid of suitable concentration for the olefins used and above 53° Bé., maintaining such contact for a period of time of about 2 to 4 hours, continuously withdrawing a liquid product comprising ester and sulphuric acid and recovering the ester from the acid.

3. Process according to claim 2, where the temperature is between 50 and 150° C.

4. Process according to claim 2, in which the temperature is about 75° C. and pressure adjusted to substantially the vapor pressure of the hydrocarbons at such temperature.

5. Process according to claim 2, in which the sulphuric acid and anhydrous acetic acid are present in proportion of 2.4 parts of weight of the latter for one part of weight of 100% sulphuric acid diluted with water to above 53° Baumé gravity.

6. Process according to claim 2, in which the liquid product comprising sulphuric acid and ester is extracted with a low boiling solvent, the solvent is then distilled and the ester recovered.

7. Process according to claim 2 in which the liquid product comprising sulphuric acid and ester is extracted with a low boiling hydrocarbon solvent, leaving the sulphuric acid, the solvent is distilled from the ester and both sulphuric acid and the recovered solvent are separately returned to the process for reuse.

8. An improved process for production of esters comprising passing hydrocarbons rich in olefins in vapor form in counter current contact with a stream of substantially anhydrous fatty acid containing between ½ and ¼ of its volume of sulphuric acid of concentration above about 53° Bé., maintaining the temperature between 50 and 150° C. and adjusting the flow of such material so as to maintain the contact for a period in excess of two hours, separately withdrawing unabsorbed vapor and liquid comprising sulphuric acid and ester and separating the ester from the acid.

9. Process according to claim 8 in which the acid used is glacial acetic acid and the hydrocarbons are rich in unsaturated hydrocarbons containing more than two carbon atoms.

10. The process of separating aliphatic monocarboxylic esters from solution in sulfuric acid by the selective solvent action of light liquid saturated hydrocarbons.

11. An improved process for the separation of a mixture of sulfuric acid and aliphatic monocarboxylic esters which comprises continuously passing the mixture in countercurrent to a stream of light saturated hydrocarbon liquid and separately withdrawing the sulfuric acid and an extract of esters in the light hydrocarbons.

PER K. FROLICH.
PHILIP L. YOUNG.